No. 880,065. PATENTED FEB. 25, 1908.
J. J. BRUNELLO.
NUT LOCK.
APPLICATION FILED FEB. 26, 1907.
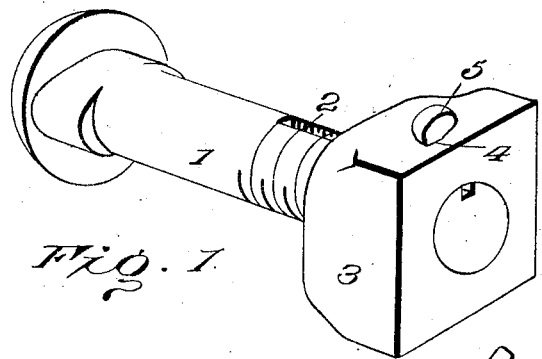
Fig. 1
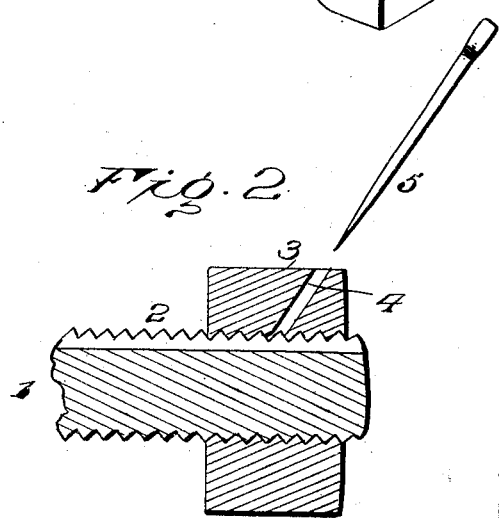
Fig. 2
Fig. 3
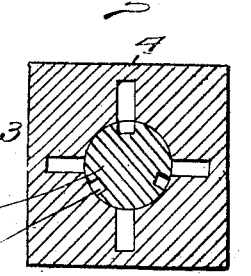
Fig. 4
Witnesses
Inventor
J. J. Brunello
By
Attorneys

UNITED STATES PATENT OFFICE.

JOHN J. BRUNELLO, OF BLUEFIELD, WEST VIRGINIA.

NUT-LOCK.

No. 880,065.     Specification of Letters Patent.     Patented Feb. 25, 1908.

Application filed February 26, 1907. Serial No. 359,361.

*To all whom it may concern:*

Be it known that I, JOHN J. BRUNELLO, a subject of the King of Italy, residing at Bluefield, in the county of Mercer and State of West Virginia, have invented certain new and useful Improvements in Nut-Locks, of which the following is a specification.

The purpose of this invention is to devise novel means for preventing the loosening of nuts of bolts or like fastenings having portions threaded to receive such nuts.

In accordance with this invention, the threaded portion of a bolt, rod or like fastener is provided in a side with a longitudinal groove or channel intersecting the threads and the nut is provided in a side with an opening leading into the bolt opening and adapted to receive a key, the end portion of which enters the longitudinal groove or channel of the bolt or fastening so as to prevent loosening of the nut after being tightened or screwed home upon the bolt or fastening.

For a full description of the invention and the merits thereof and also to acquire a knowledge of the details of construction and the means for effecting the result, reference is to be had to the following description and accompanying drawings, in which:

Figure 1 is a perspective view of a bolt and nut embodying the invention. Fig. 2 is a longitudinal section of the threaded portion of the bolt and nut showing the opening in the latter registering with the groove or channel in the side of the bolt. Fig. 3 is a view similar to Fig. 2 having a key in position. Fig. 4 is a sectional view of a modification.

Corresponding and like parts are referred to in the following description and indicated in all the views of the drawings by the same reference characters.

The bolt 1 is illustrative of the type of fastening for which the invention is designed and is provided in a side with a groove or channel 2 which intersects the threaded portion. The nut 3 is provided in a side with an opening 4, said opening preferably being inclined toward the base of the nut to insure the key being properly deflected and entering the groove or channel when locking the nut to the bolt or fastening when tightened and adjusted to bring the opening and groove in register. The key 5 is of wrought metal and preferably tapers and is adapted to be driven into the opening 4 and groove or channel 2. The inclination of the opening 4 together with a bevel at the end of the key insures the latter entering the groove or channel 2 when driving the key home. The key is formed with a head which limits its inward movement and enables a suitable tool, such as a claw, to be fitted thereto for extracting the key when it may be required to remove the nut, thereby admitting of the bolt or fastening being used repeatedly. It is also noted that a cross section of the key represents the interlocking portion or the area of the part corresponding to the joint between the nut and bolt; hence upon the application of sufficient force to the nut to turn the same, the key may be cut by a shear action, thereby permitting the nut to be removed. This would not be the case if the key entered matching grooves formed in the bolt 1 and in the bolt opening of the nut. Moreover, the provision of the opening 4 enables the invention to be readily adapted to bolts and fastenings already constructed since the same may be provided with the groove or channel 2 and the opening 4 at a comparatively small expense, the groove or channel being milled and the opening 4 drilled or punched.

It is to be understood that the bolt or fastening 1 may be provided in a side with a plurality of grooves or channels 2, thereby making provision for a nicety of adjustment of the nut so as to receive the key 5. It is also proposed to provide the nut 3 with a series of openings 4, which are spaced differently from those in the bolt, whereby one opening registers with one of the grooves at each fraction of a turn. These two features are shown most clearly in Fig. 4 and provide for a great range of adjustment of the nut so that the same may be secured practically at almost any point in a revolution.

Having thus described the invention, what is claimed as new is:

A nut lock comprising a bolt having one end thereof threaded and provided with a plurality of longitudinally disposed grooves, a nut fitted upon the threaded end of the bolt and formed with a plurality of lateral openings extending from the sides of the nut to the bolt receiving opening therethrough, the said lateral openings being inclined inwardly toward the base of the nut and being spaced differently from the before mentioned longitudinal grooves in the bolt, and a locking key adapted to be driven through one of the inclined openings in the nut and to be deflected into the registering groove of the bolt, the said key being provided with a beveled end which coöperates with the inclination of the lateral opening to insure a proper deflection of the point of the key, and also with a head which limits the inward movement of the key and forms a means for withdrawing the same.

In testimony whereof I affix my signature in presence of two witnesses.

JOHN J. BRUNELLO.

Witnesses:
GEO. L. DREIND,
FLOYD J. BROW